United States Patent Office 3,626,531
Patented Dec. 14, 1971

3,626,531
METHOD FOR FORMING ULTRA HIGH-STRENGTH BUCKABLE RIVETS
Marshall R. Mazer, Philadelphia, and Raymond Ollis, Jr., Oreland, Pa., assignors to Standard Pressed Steel Co., Jenkintown, Pa.
Filed May 29, 1969, Ser. No. 828,956
Int. Cl. B21k *1/58;* B23g *9/00*
U.S. Cl. 10—27                     7 Claims

ABSTRACT OF THE DISCLOSURE

A method of forming an ultra high-strength buckable bolt, such as a rivet, wherein an initially uniformly soft rivet blank is selectively cold worked to selectively work harden a portion of the rivet blank while maintaining another portion of the blank in the initially soft condition. After heat treating, the blank is machined to the final rivet shape with the softer portion being retained as the rivet tail so that it can be readily upset, as by bucking or squeezing, without cracking when the rivet is installed.

---

This invention relates to rivets and more particularly to a method of forming an ultra high-strength shank portion in a rivet while maintaining a relatively soft and ductile tail portion so that the tail can be upset at installation without cracking.

The increasing performance characteristics of modern high speed aircraft and missile and space vehicles has accentuated the need for high-strength, light-weight fastening members, such as rivets. Since modern high speed aircraft require more than a million separate fastening members, the problem of obtaining high-strength fastening members, to satisfy rigid strength requirements, and the associated problem of maintaining as light as weight as possible in the aircraft frame, to increase the load carrying capabilities of the aircraft, become increasingly acute. In recent years, the necessity for obtaining light-weight, high-strength materials for use as fastening members has resulted in metallurgical advances which have produced a number of exotic high-strength, light-weight alloys particularly adapted for these purposes. At present, titanium and alloys of titanium are the principal alloys used in critical situations where high-strength and light-weight are necessary, for example, in the construction of high speed aircraft and missile frames, and in the fasteners used therein. At present, the most sophisticated titanium alloys used in fastening members, such as rivets or buckable bolts, develop a shear strength of approximately 90,000 p.s.i. in the shank of the rivet. It is, of course, desirous to produce rivets which have a much higher shear strength in the shank portion but to date modern metallurgical technology has not developed suitable light-weight alloys which can meet higher shear strength characteristics and still be buckable.

Certain of the alloys of the type which are used in high-strength, light-weight rivets can be cold worked to increase their hardness and concurrently raise the shear strength response characteristic of the alloy. However, this increase in hardness also decreases the ductility and increases the brittleness of the alloy so that when the tail of the rivet is bucked or squeezed to complete the fastening installation, the rivet cracks and, hence, weakens the structural integrity of the joint. Thus, heretofore, such rivets have not been cold worked to increase shear strength performance characteristics.

Accordingly, it is an object of the present invention to provide a method to produce rivets which have a shear strength in the shank portion in excess of 90,000 p.s.i.

It is a still further object of the present invention to provide a method to produce ultra high-strength rivets using presently available alloys.

A further object of the present invention is to produce such ultra high-strength rivets utilizing a commercially feasible manufacturing technique.

A still further object of the present invention is to provide a method to produce a high-strength rivet wherein a portion of the shank of the rivet is hard and the tail of the rivet shank is relatively soft so as to remain ductile to permit the tail to be bucked or squeezed at installation without cracking.

In accordance with a preferred embodiment of the method of the present invention, a uniformly soft rivet blank of a mechanically workable material is placed in an extrusion die. A portion of the blank is dimensioned to sit freely in the die while the remainder of the blank has a larger diameter than the diameter of the die receiving bore so that it is restrained from movement within the die. A selective portion of the blank is cold worked by forcing the larger diameter portion of the blank into the die thus reducing the diameter of this portion of the blank to the diameter of the die bore and, consequently, cold working this selective portion of the blank to work harden the material. The blank is removed from the die, age hardened by heat treating and then machined to its ultimate rivet shape. Thus, the head and the major portion of the shank are selectively cold worked, to increase the strength of the material while a segment of the blank, which was initially free fitting in the die, is not cold worked and remains relatively soft and ductile. Thus, this ductile tail portion can be readily upset at the time of rivet installation to form a rivet joint wherein the rivet bucktail does not crack when bucked or squeezed.

These and other aspects and advantages of the present invention will be more readily apparent when considered in conjunction with the following description and the accompanying drawings wherein.

While the present invention is particularly adaptable for use with high-strength, light-weight materials used in aircraft and aerospace applications, it is to be understood that it is equally applicable for use with any material which can be "mechanically worked." As used herein a mechanically worked material refers to that class of materials which develop high-strength properties either by the combination of mechanical working and heat treatment or by mechanical working alone.

Figure 1:
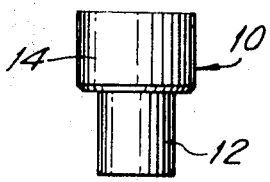
FIG. 1 is an elevational view of the initial rivet blank.

With reference to the drawings and particularly FIG. 1, a rivet blank 10 is shown having an initial configuration comprising a cylindrical shank portion 12 and an integral cylindrical head portion 14 of greater diameter than the shank portion 12. The material of the rivet blank can be of any metal or metal alloy having the property of being mechanically worked, i.e., greatly strengthened by cold-working. For example, A 286 steel, 18–8 stainless steel, K-Monel and Monel, Inconel 718 and Inconel X, Waspaloy, Udimet 500, N–155, Hastelloy, Rene 41, Discalloy, M 252, L–605, Al 7075 and cobalt-nickel based alloys such as are taught in U.S. Pat. 3,356,542 and sold by Latrobe Steel Co., under the trade designation Multiphase may be employed.

Figure 2:
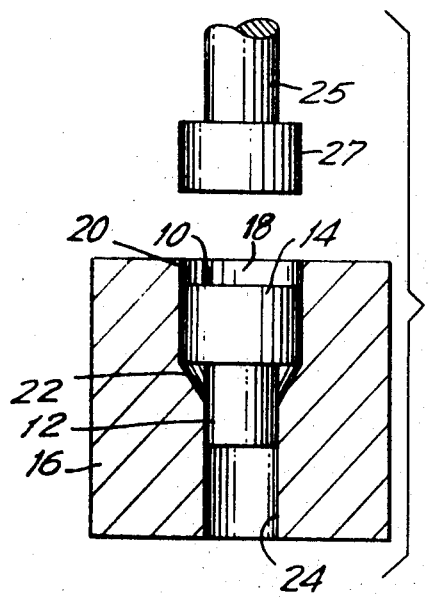
FIG. 2 is an exploded view, partly in section, showing the die and the initial rivet blank.

The rivet blank 10 in an initial uniformly soft condition, i.e., $R_B$ 90 when using the Multiphase alloy, is placed in an extrusion die 16 (FIG. 2) which includes a rivet blank receiving opening 18 having a bore 20 therein of a diameter to accommodate the head of the rivet 10 and a frusto-conical portion 22 which reduces the internal bore diameter 18 to a rivet shank receiving bore 24 having a diameter slightly greater than the diameter of the shank 12 of the rivet blank. Preferably, the frusto-conical segment has an included angle of 100° to coincide with the standard countersunk hole used in rivet installation. Once the rive blank is seated in the die 16, a ram 25 having a rivet blank contacting head 27, of approximately the same diameter as the larger bore 20 in die 16, is actuated so as to contact the head 14 within the die and force the blank 10 into the die cavity. As the blank 10 is forced into the die by ram 25, a portion of the material from the head 14 of the rivet blank is extruded and flows into the frusto-conical portion 22 and bore 24 of the die. The extrusion of the selected portion of the blank results in a reduction in diameter of a selected portion of the rivet blank material and significantly increases the hardness of the portion of the blank which has been reduced.

Figure 3:
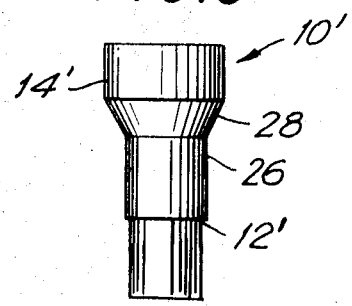
FIG. 3 is an elevational view of the rivet blank after it has been removed from the die.

The blank is then removed from the die 16, for example by punching it out the larger diameter end of the die, and now has the configuration shown at 10' in FIG. 3 wherein the original shank portion 12 retains its initial shape as this portion of the blank 10' has not been subjected to cold working but was merely carried in the bore 24 of die 16 when the ram was actuated. It is to be noted that a slight degree of cold working of shank 12 results due to the impact sustained when the blank is punched out of the die but, this cold working is not significant and does not destroy the ductile properties of shank portion 12.

Immediately above the soft shank portion 12 is a slightly larger cylindrical segment 26. This is the portion which has been significantly work hardened due to cold working as a result of the extrusion process. Shank portion 26 is of a slightly larger diameter than portion 12 as this segment of the blank was formed by the extrusion of segment 10 and was reduced in diameter to only the die bore diameter 24.

Above portion 26 is a frusto-conical portion 28 conforming in shape to the frusto-conical portion 22 in die 16. The remainder of the head 14', while subjected to a limited degree of cold working due to the upsetting impact of the ram, retains almost the original softness of the initial blank and is slightly expanded due to an expansion of the head portion 14 within the bore in die 16.

When made of certain materials, such as the Multiphase alloy, rivet blank 10' may be subjected to an age hardening cycle to increase the hardness of the work hardened portions and relieve internal stress concentrations on the blank. A heat treat cycle of four hours at 1200° F. has been found to be effective for rivets made of Multiphase alloy, however, the time-temperature combination of the heat treat cycle may be varied depending upon the degree of work hardening.

Figure 4:
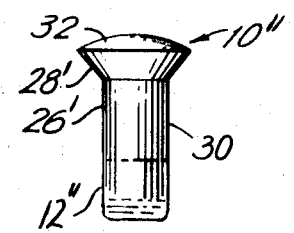
FIG. 4 is an elevational view showing the final shape of the rivet.

The blank is now machined to the final rivet shape, shown at 10" in FIG. 4, to provide a configuration conforming to the final rivet dimensions desired. The rivet 10" has a rivet shank portion of uniform diameter and may have a dome-shaped head 32. The dome-shaped head eliminates fillet cracking during installation of the rivet. The shank portion 30 comprises a buckable tip or tail portion 12" of relatively soft physical properties so as to be more ductile, an intermediate portion 26' which, due to the cold working operation performed in die 16 and the age hardening heat treat, if performed, has a significantly greater hardness so as to be less ductile, and a frusto-conical head portion 28' adapted to seat in a countersunk receiving hole in a structural member in which the rivet is installed. The head portion 28' is harder than the soft tail 12" and less hard than the portion 26' of the rivet shank 30

Figure 5:
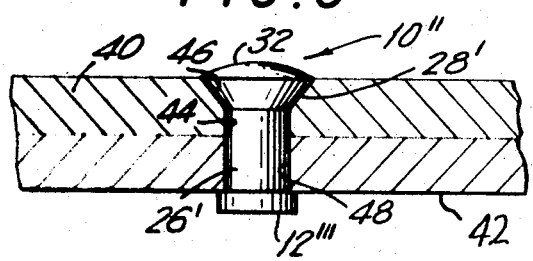
FIG. 5 is a partial sectional view of a rivet installed in a joint.

When the rivet is installed, for example to secure structural members 40 and 42 together (FIG. 5), the hard shank portion 26' is placed in a receiving hole 44 in one of the facing structural members having a countersunk portion 46 to receive the head portion 28'. The hardened portion 26' of the rivet shank is then disposed within hole 44 of member 40 and aligned hole 48 in member 42. Thus, the hardened high shear stress resistant portion of the rivet shank is positioned between the interface of the two members with the more ductile and readily buckable tail extending beyond member 42.

The rivet is then bucked or squeezed, according to common practice, and since the tail portion 12" is relatively soft, the tail is cold worked while being disposed to form the rivet bucktail 12'''. Since the tail portion is soft and ductile, the upsetting by bucking or squeezing does not cause cracking. Additionally, the bucking work hardens the rivet tail, as well as the rivet head, so that after the rivet has been installed the rivet comprises a hardened head and tail portion.

Illustratively, for a Multiphase alloy, the intial rivet blank 10 has a uniform hardness of approximately $R_B$ 90. After the extrusion process, the hardened shank portion 26 has a hardness in the range of $R_c$ 40–60 and preferably $R_c$ 49. After age hardening, the shank portion 26 has a hardness in the range of $R_c$ 44–64 and preferably $R_c$ 53. The slight cold working imparted to portion 12 due to the force necessary to remove the blank from the die increases the hardness of this segment of the blank to approximately $R_c$ 20. There is also a narrow transition zone between portions 12 and 26 where the hardness increases from $R_c$ 20 to $R_c$ 53.

Rivets having a nominal .250 inch diameter shank were prepared according to the present invention using a Multiphase alloy designated as MP35N. These rivets were installed in .150 inch thick sheets of annealed Ti6Al-4V and tested for shear strength with the result that all rivets tested exhibited shear strengths in excess of 150,000 p.s.i.

It is thus seen that by the method of the present invention a rivet is produced which has a hardened high-strength shank portion and softer ductile tail portion. The shank of the rivet can withstand shear stress in excess of 150,000 p.s.i. while the tail can be readily bucked at installation without cracking since it is soft and ductile.

We claim:
1. A method for forming an ultra high-strength rivet comprising:
   preparing an integral blank of uniformly soft material exhibiting the property of being mechanically workable, said blank having a cylindrical shank and a head of greater diameter than said shank;
   placing said blank in a cavity in an extrusion die, said cavity being dimensioned so that the shank portion of said blank may move through said die cavity without being subjected to plastic deformation and work hardening while said head portion is constrained against free movement within said die;
   placing a force on said blank in said die thereby to force a portion of said head further into the cavity in said die to cause said portion of the material of said head to flow into said die cavity and be selectively cold worked thereby to work harden said portion of said blank and increase its hardness and strength while maintaining said shank portion in its initial uniformly soft condition.

2. The method as defined in claim 1 wherein said material is selected from the group consisting of A 286 steel, 18-8 stainless steel, Inconel 718, Inconel X, Waspaloy, Udimet 500, N-155, Hastelloy, Rene 41, Discalloy, M 252, N-605, and Multiphase.

3. The method as defined in claim 1 wherein said material is Multiphase.

4. The method as defined in claim 3 including the step of age hardening said blank after it is removed from said extrusion die thereby to increase the hardness and mechanical strength of said work hardened portion.

5. The method as defined in claim 4 wherein said age hardening is accomplished by heat treating said blank for four hours at 1200° F.

6. The method as defined in claim 1 including the step of machining said blank to conform its configuration to the final rivet shape desired.

7. The method as defined in claim 1 wherein said cavity in said die comprises a first portion, a second portion and a third cylindrical portion all communicating with each other, said first portion being dimensioned to accommodate said blank head, said third portion having a diameter to accommodate said blank shank and said second portion interconnecting said first and third portions thereby to effect a reduction in said cavity from said first to said third portion.

References Cited

UNITED STATES PATENTS

| | | | |
|---|---|---|---|
| 2,113,172 | 4/1938 | Cordes | 10—27 |
| 3,072,933 | 1/1963 | Carlson | 10—27 |
| 3,298,725 | 1/1967 | Boteler | 85—1 X |
| 3,405,594 | 10/1968 | Falcioni | 10—27 X |

FOREIGN PATENTS

| | | | |
|---|---|---|---|
| 685,834 | 1/1953 | Great Britain | 10—27 |

JOHN F. CAMPBELL, Primary Examiner

V. A. DI PALMA, Assistant Examiner

U.S. Cl. X.R.

29—557